(No Model.)

W. S. FOX.
DEVICE FOR MOLDING ARTICLES FROM GLASS.

No. 406,165. Patented July 2, 1889.

Witnesses:
James H. Bill
A. E. Paige

Inventor
Wm. S. Fox,
By Hollingsworth & Haley

N. PETERS, Photo-Lithographer, Washington, D.C.

UNITED STATES PATENT OFFICE.

WILLIAM S. FOX, OF PHILADELPHIA, PENNSYLVANIA.

DEVICE FOR MOLDING ARTICLES FROM GLASS.

SPECIFICATION forming part of Letters Patent No. 406,165, dated July 2, 1889.

Application filed March 27, 1889. Serial No. 305,000. (No model.)

*To all whom it may concern:*

Be it known that I, WILLIAM S. FOX, of Philadelphia, in the State of Pennsylvania, have invented certain new and useful Improvements in Devices for Molding Articles from Glass, of which the following is a specification.

The following is a specification of my improvements as embodied in a mold for bottle-stoppers, reference being had to the accompanying drawings, in which—

Figure 1:
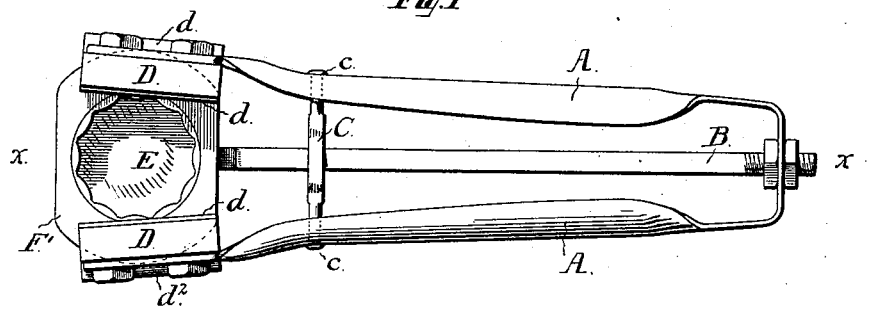
Figure 2:
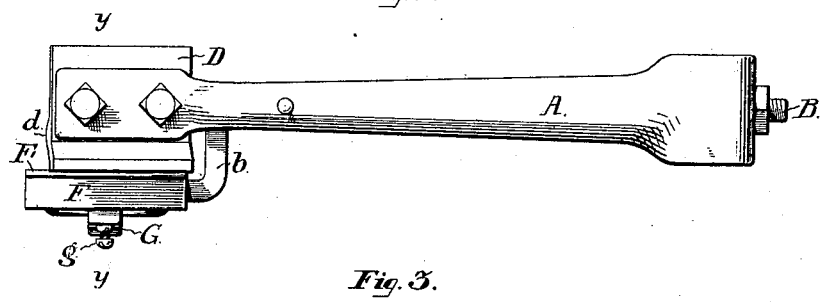
Figure 3:
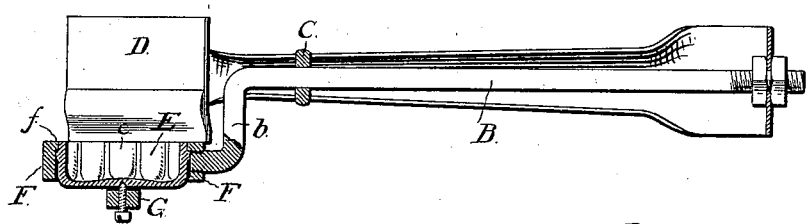
Figure 4:
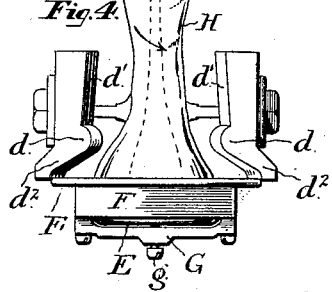
Figure 5:
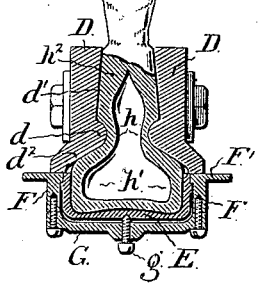
Figure 6:
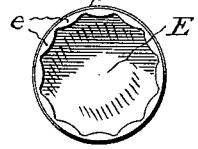
Figure 7:
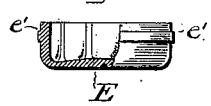

Figure 1 represents a top or plan view of the device with the jaws of the mold open. Fig. 2 is a side elevation thereof. Fig. 3 is a central longitudinal section on the line $x\,x$ of Fig. 1. Fig. 4 is an end view of the device with the jaws open, showing also the glass to be molded as first placed in the mold. Fig. 5 is a transverse section on the line $y\,y$ of Fig. 2 through the mold, with the jaws in a closed position, illustrating the final result of the molding operation. Fig. 6 is a detail view in plan showing a portion of the mold detached, and Fig. 7 is partly a side elevation and partly a vertical section of the portion shown in Fig. 6.

The object of my invention is to provide a means whereby one part of a glass article can be formed or shaped by rotating the same in contact with a molding-surface, while the remainder of said article is shaped in a mold within which the glass is stationary relatively thereto. Thus, for instance, in the formation of a bottle-stopper (which has been selected for illustration here) the neck and the shank of the stopper have a round contour produced by rotating the glass while in a plastic condition in contact with surfaces which are adapted to produce the proper shape, while the head of the stopper has a fluted, indented, or otherwise irregularly-shaped periphery, which could not of course be produced by rotation against a fixed surface.

Primarily, therefore, my invention consists in combining with a non-rotating molding-surface adapted to press against the side of a rotating piece of glass a rotatable mold adapted to receive the central or axial portion of said glass.

In the accompanying drawings and in the foregoing type mentioned for the illustration of my invention I have shown a convenient form of mold for making bottle-stoppers; but it must be understood that the use of the invention is not limited to any article or class of articles, nor to the particular method of mounting the essential parts of the device.

In the accompanying drawings, A A represent a pair of spring-tongs terminating at their free ends in molding-blocks D D, whose proximate surfaces have in this instance the configuration indicated more clearly in Fig. 4, and the sectional view of Fig. 5—that is to say, for some distance down from the top the molding-surface of each block is slightly inclined, as shown at $d'$, until it reaches a rounded fillet $d$, from the bottom of which it flares abruptly outward, as shown at $d^2$.

At the junction of the tongs D D is attached a rod B, which carries a guide-piece C, whose cylindrical ends $c$ project laterally through the tongs, as shown, and are provided with heads and shoulders to limit the movement thereof in both directions. A short distance beyond said guide-piece the rod B bends down at a right angle, as shown at $b$, and supports the mold-carrier F, which consists of a metal ring with a flat horizontal flange F′, upon whose surface the mold-blocks D slide freely, but in close contact therewith.

Within the circular opening of the mold-carrier F is the rotating mold E, having an annular rim or flange $e'$, which fits up against a corresponding flange $f$ on the inside periphery of the mold-carrier F. A bridge-piece G, secured on the bottom of the mold-carrier, extends across the opening of the same, and is provided at its center with a screw $g$, whose point enters a depression in the center of the rotating mold E, so as to form a pivot upon which the latter can turn freely. The inner periphery of the rotating mold is in the present instance formed with a series of rounded projections $e$, adapted to produce corresponding depressions in the article to be molded, so that it shall have a fluted appearance.

The mode of operation is as follows: A ball of glass being taken up in the usual manner upon the end of a tube slightly elongated, is pressed into the mold E and distended until it fills said mold. This position of the glass and mold is shown in Fig. 4. The rod is then rotated and the tongs A are pressed together, so as to bring the surfaces of the molding-blocks D against the sides of the protruding glass. The rotation and inward pressure are continued until the limit of movement of the tongs inward has been reached. This position is shown in the sectional view of Fig. 5, where it will be seen that the head $h'$ of the bottle-stopper is shaped in the rotating mold E, while the neck $h$ is properly reduced by means of the fillets $d$, and the tapering shank $h^2$ is formed by the inclined sides $d'$. The completed stopper is then severed in the usual manner from the glass, which adheres to the tube, and the article is completed.

By this method of operation I can not only cheaply produce articles one portion of which is fluted or irregularly shaped, while the remainder has a true rounded contour, but I also obtain a smoothness and finish in the rounded portions, which enables me to dispense in a great measure with the polishing operation. The method may also be pursued with great advantage as a preliminary step in making cut-glass articles, since the approximate form may be given in the mold, and the labor of cutting thus greatly reduced.

As above stated, I do not limit my claim to the use of any particular shape of mold or molds, nor to the use of two mold-blocks, since the configuration and arrangement both of the rotating and the non-rotating parts may be varied without departing from the essential principles of the invention; nor do I limit my claim to the foregoing mode of mounting the stationary and rotating parts.

I am aware that it is not new to combine with a stationary central or axial mold-plate a rotating surrounding mold, and to construct said surrounding mold in two parts in order to permit the same to be opened and closed. I do not, however, claim such an arrangement, nor would it be possible to use the same in the manner and for the purposes characteristic of my invention. The distinguishing features of my improvements lie in the fact that during the molding process both the rotary and lateral movements of the several parts shall co-operate, while in the devices above referred to the non-rotating portions of the mold had no lateral movement, and the capacity for lateral movement of the rotating portions had no relation to the molding process, but only permitted the mold to be opened after such process was complete.

I claim in a glass-molding device—

1. The combination of a central rotating mold, a lateral non-rotating mold-block, and means, substantially as set forth, whereby the mold-block may be moved transversely to the axis of rotation of the mold during the rotation of the latter.

2. The combination of a pair of tongs, a pair of mold-blocks attached to the free ends of said tongs, a mold-carrier suitably mounted upon said tongs, and a rotating mold freely mounted within said carrier, substantially as set forth.

3. The combination of a pair of spring-tongs, a pair of mold-blocks mounted upon the free ends of said tongs, a rod attached to the center of said tongs, a guide and stop piece arranged upon said rod, a mold-carrier mounted upon said rod and having a horizontal flange on which said mold-blocks move, and a rotating mold freely mounted within said mold-carrier, substantially as set forth.

WILLIAM S. FOX.

Witnesses:
HENRY N. PAUL, Jr.,
JAMES H. BELL.